Oct. 13, 1959     H. A. JOHNSON     2,908,048
PREFABRICATED BUILDING PANELS
Filed June 28, 1956     6 Sheets-Sheet 1
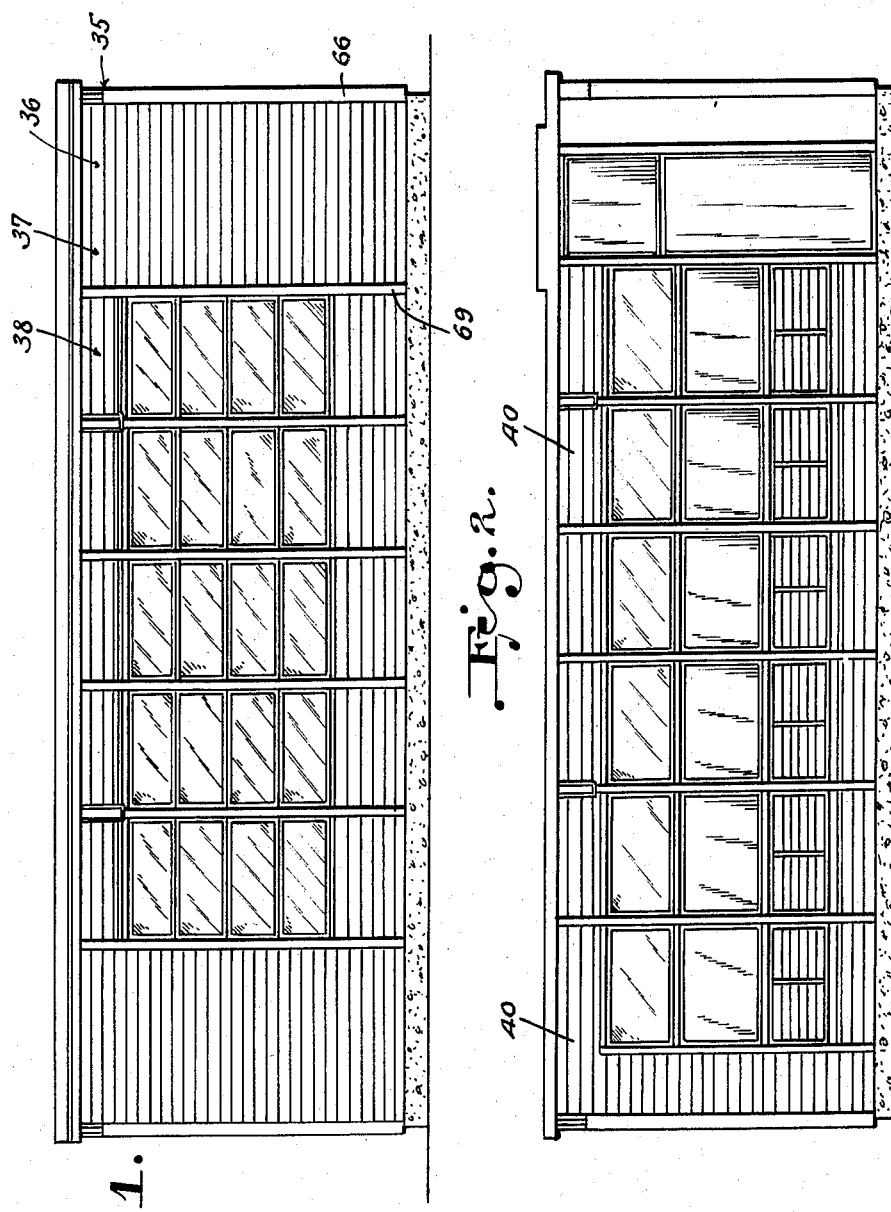
Howard A. Johnson
INVENTOR
BY *CASnow+Co.*
ATTORNEYS.

Oct. 13, 1959 H. A. JOHNSON 2,908,048
PREFABRICATED BUILDING PANELS
Filed June 28, 1956 6 Sheets-Sheet 2
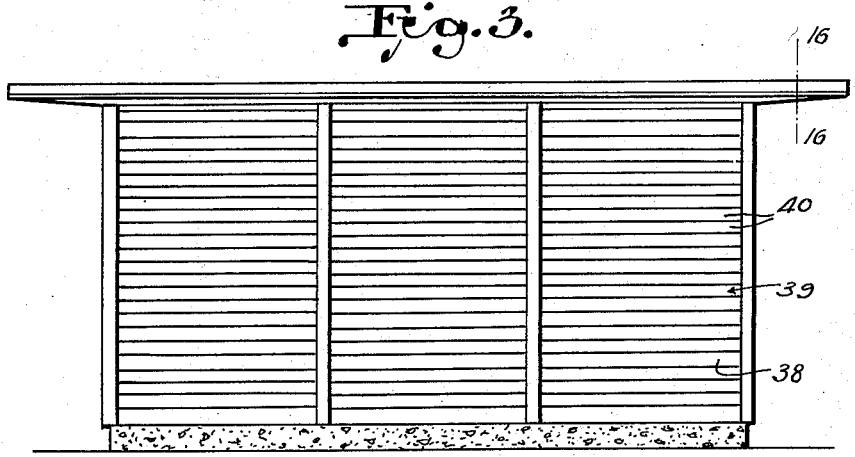
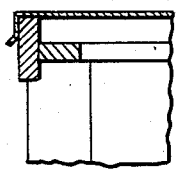
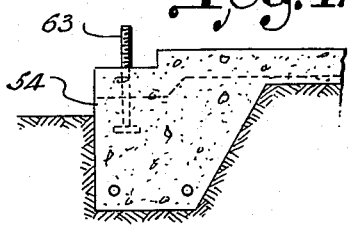
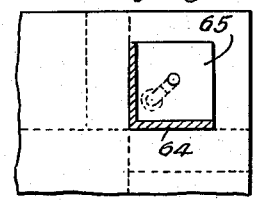
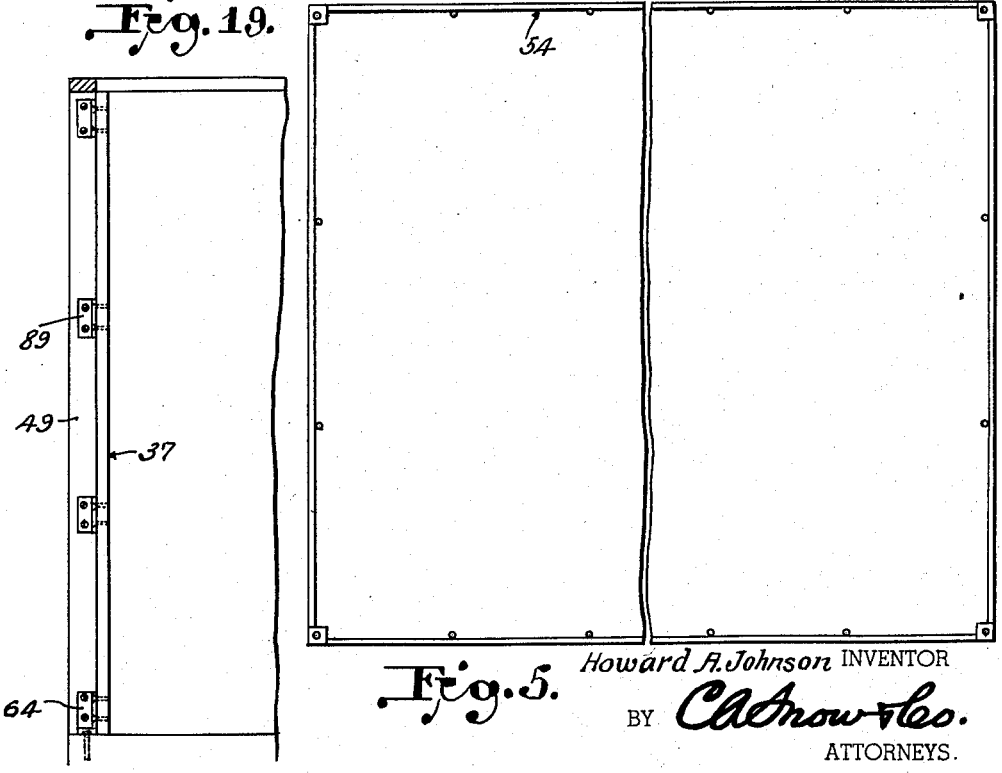
Howard A. Johnson INVENTOR
BY Cadnow+Co.
ATTORNEYS.

Oct. 13, 1959     H. A. JOHNSON     2,908,048
PREFABRICATED BUILDING PANELS
Filed June 28, 1956     6 Sheets-Sheet 3
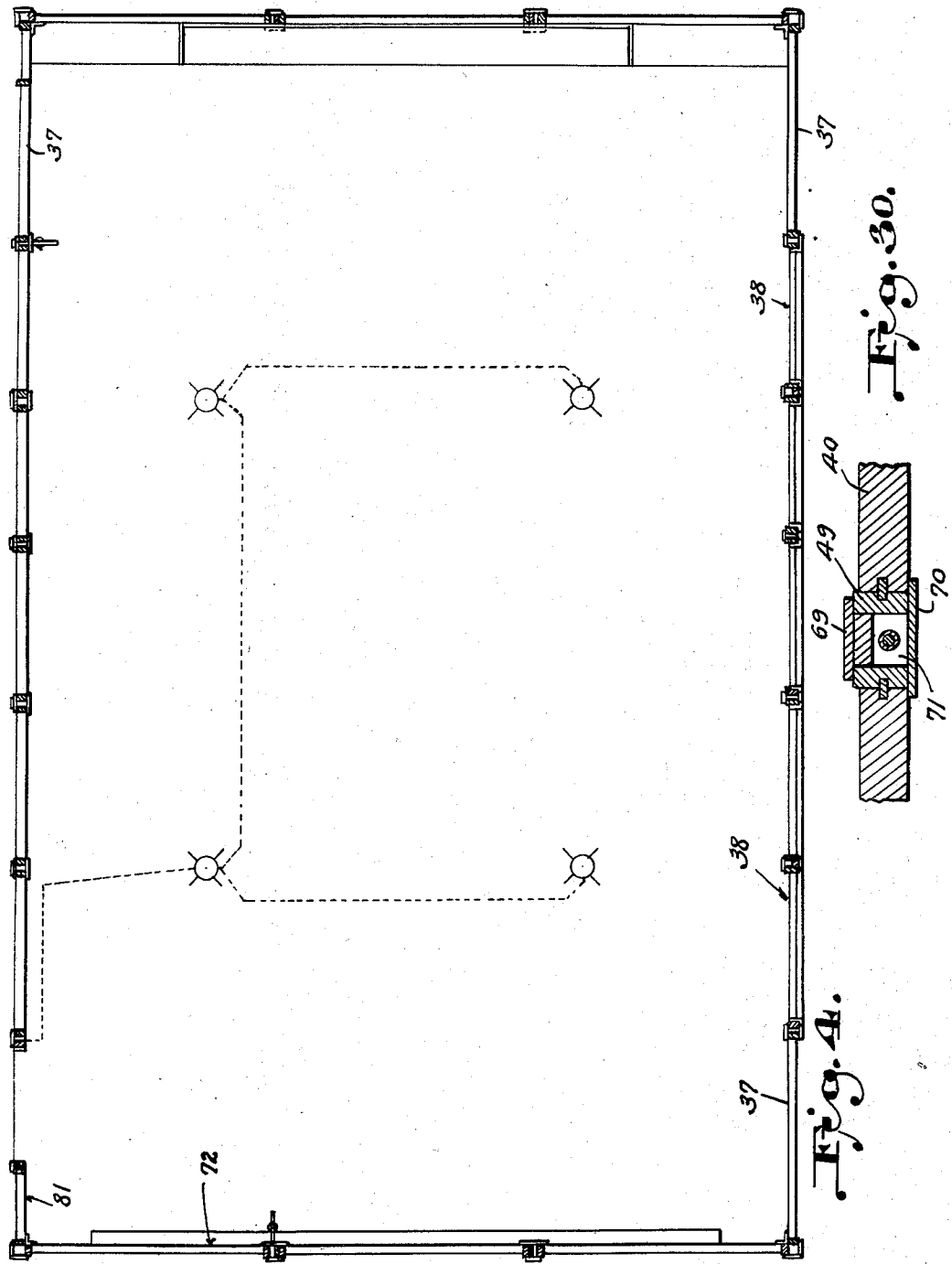
Howard A. Johnson
INVENTOR Oct. 13, 1959 H. A. JOHNSON 2,908,048
PREFABRICATED BUILDING PANELS
Filed June 28, 1956 6 Sheets-Sheet 4
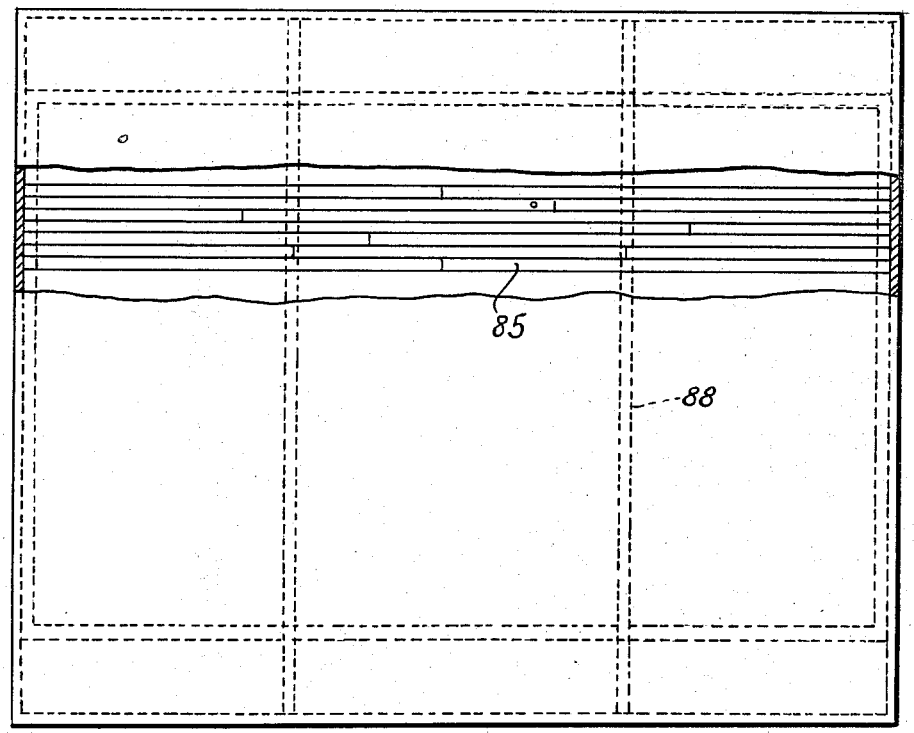
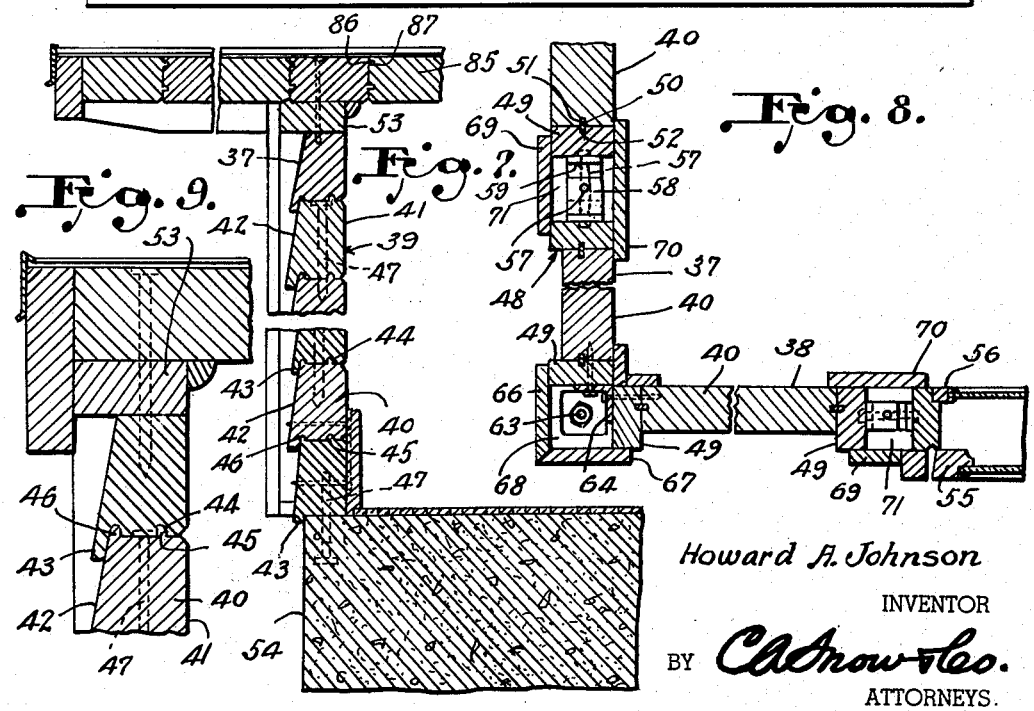
Howard A. Johnson
INVENTOR
BY CA Snow &Co.
ATTORNEYS.

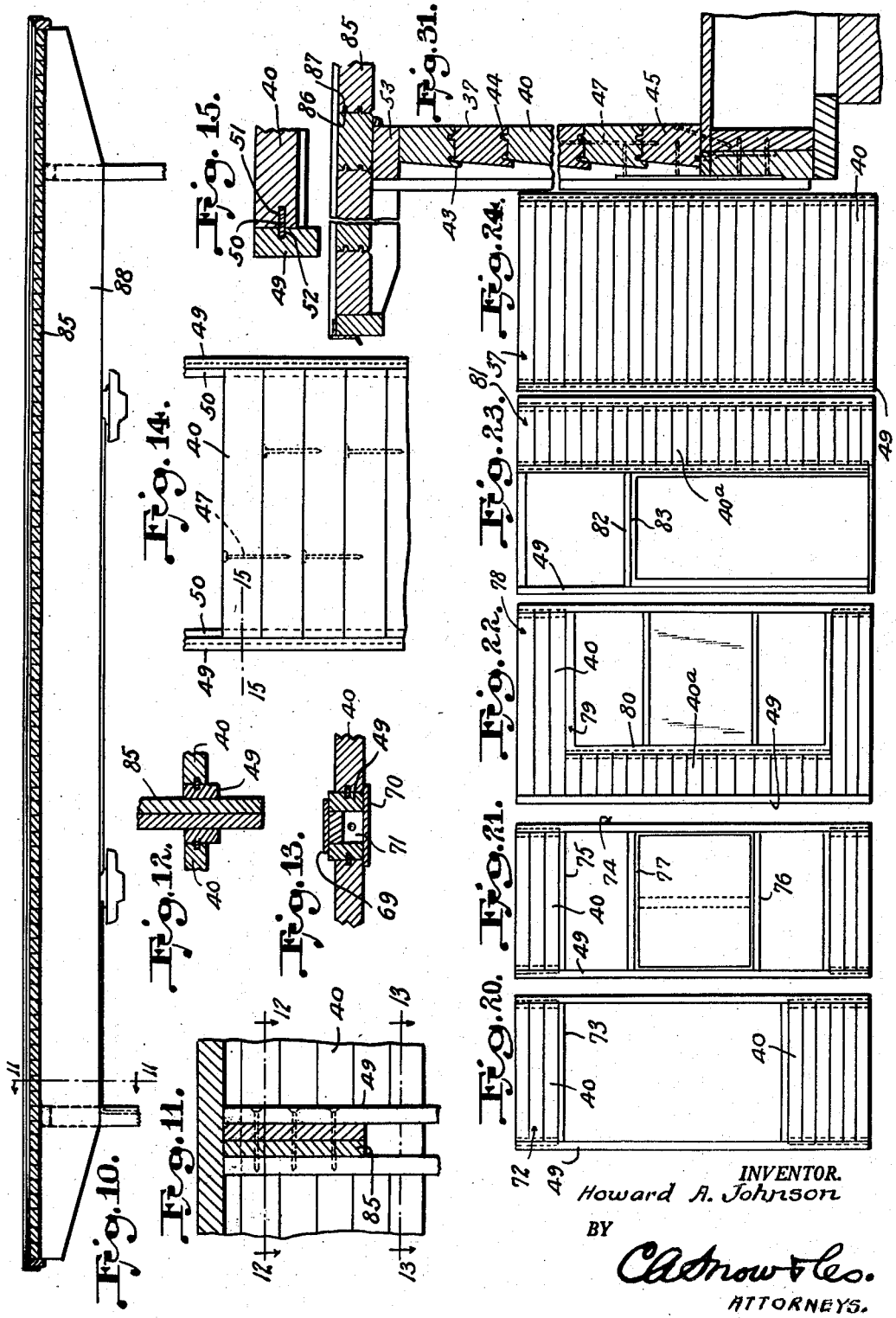

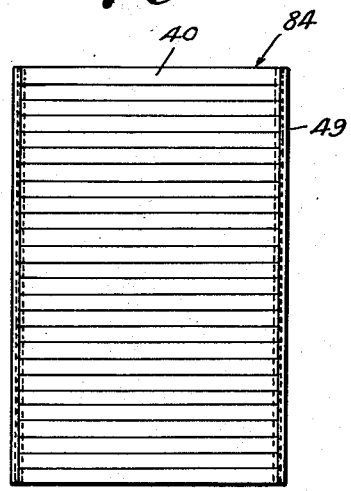
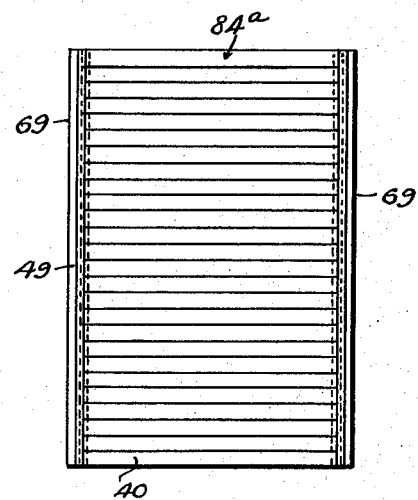
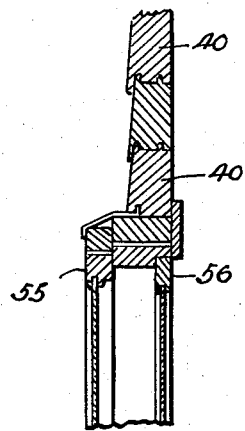
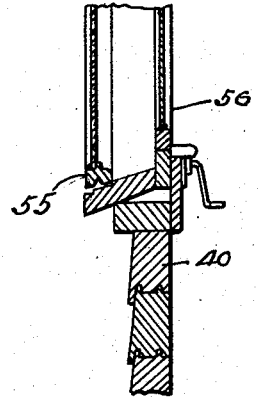
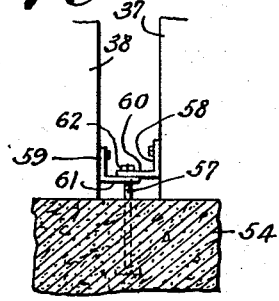
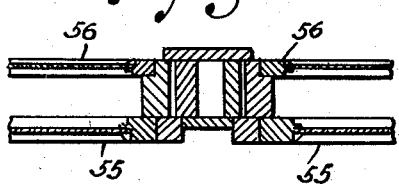

United States Patent Office 2,908,048
Patented Oct. 13, 1959

2,908,048

PREFABRICATED BUILDING PANELS

Howard A. Johnson, West Palm Beach, Fla., assignor to Walter & Johnson, West Palm Beach, Fla.

Application June 28, 1956, Serial No. 594,675

1 Claim. (Cl. 20—2)

This invention relates to a prefabricated building.

An object of this invention is to provide in a prefabricated building structure improved siding members formed of double tongue and groove boards, with a depending flange on the lower edge of each board adapted to overhang the upper edge of the lower board.

Another object of this invention is to provide improved siding boards which simulate the appearance of lap boards, but which are so constructed that they are secured together by non-exposed hidden nails driven vertically downwardly from an upper board to a lower board.

A further object of this invention is to provide an improved siding which will form weather-tight joints.

A further object of this invention is to provide an improved means for securing the ends of the horizontal boards to the stiles or vertical frame members of the panels.

A further object of this invention is to provide an improved siding assembly wherein the nails securing the siding members together are concealed and not exposed to the weather conditions. The concealed nails also serve the function of clamping the siding members together when glue or a sealing material is used between the siding members.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 1 is a detail side elevation of a prefabricated building construction according to an embodiment of this invention.

Fig. 2 is a detail front elevation of the building.

Fig. 3 is an end elevation of a modified form of this invention.

Fig. 4 is a horizontal section taken through a building structure according to an embodiment of this invention.

Fig. 5 is a ground plan view of the building.

Fig. 6 is a plan view partly broken away and in section of the roof construction.

Fig. 7 is a fragmentary vertical section through the building showing the details of the siding construction.

Fig. 8 is a fragmentary horizontal section through one corner of the building.

Fig. 9 is a fragmentary sectional view taken through the upper portion of the building.

Fig. 10 is a fragmentary vertical section showing the roof construction.

Fig. 11 is a fragmentary sectional view taken on line 11—11 of Fig. 10.

Fig. 12 is a fragmentary sectional view taken on line 12—12 of Fig. 11.

Fig. 13 is a fragmentary sectional view taken on line 13—13 of Fig. 11.

Fig. 14 is a fragmentary inner side elevation of one of the siding panels.

Fig. 15 is a fragmentary sectional view taken on line 15—15 of Fig. 14.

Fig. 16 is a fragmentary sectional view taken on line 16—16 of Fig. 3.

Fig. 17 is a fragmentary side elevation of the foundation.

Fig. 18 is a fragmentary horizontal section of a corner detail.

Fig. 19 is a fragmentary vertical section showing a corner fastening means.

Fig. 20 is a detail side elevation of one form of panel assembly.

Fig. 21 is an outer side elevation of another panel assembly.

Fig. 22 is an outer side elevation of a further panel assembly.

Fig. 23 is an outer side elevation of a still further form of panel assembly.

Fig. 24 is an outer side elevation of a further form of panel assembly.

Fig. 25 is an inner side elevation of a panel similar to Fig. 24.

Fig. 26 is a modified form of panel assembly.

Fig. 27 is a fragmentary vertical section through the upper portion of a window frame and siding construction.

Fig. 28 is a view similar to Fig. 27 showing the lower portion of the window and panel construction.

Fig. 29 is a fragmentary horizontal section through adjacent window carrying panels.

Fig. 30 is a fragmentary horizontal section through abutting panels showing the space therebetween for service elements.

Fig. 31 is a fragmentary vertical section similar to Fig. 7 showing the floor space above the foundation.

Fig. 32 is a fragmentary vertical section showing the connection between adjacent panels.

Referring to the drawings, the numeral 35 designates generally a building construction which includes vertical walls 36 formed of prefabricated panels indicated at 37 and 38. The panels 37 are formed of secured together siding boards which are shown in detail in Figs. 7 and 9. These siding members indicated generally at 39 are formed of boards 40 having substantial thickness and formed with a vertical inner face 41. The boards 40 are formed with downwardly and outwardly inclined faces 42 and each board 40 is provided with a downwardly projecting flange 43 which is adapted to overlap the upper edge of a preceding siding board. Each board 40 is formed at the bottom thereof with a pair of spaced grooves 44 with one groove 44 having the outer wall thereof merging with the inner side of the adjacent flange 43. The upper edge of each siding member 40 is also provided with inner and outer tongues 45 and 46. The outer side or face of the tongue 46 merges with the outer inclined face 42 of the siding member. These siding members 40 are secured together by means of vertically disposed nails or fastening members 47 which project downwardly from an upper siding mmeber and are extended into an adjacent preceding side member 40, as shown in dotted lines in Fig. 7. The siding members can also be glued together along with nails. In this case the nails would not only be the means of clamping the siding members for the curing of the glue, but would also serve for structural strength. The siding members 41 are mounted in a frame structure generally indicated at 48. This frame structure 48 is formed of vertical stile or side members 49 and the ends of the siding members 40 are secured relatively to the stile members 49 by means of a locking key 50 which is secured as by glue or other fastening means in confronting grooves 51 and 52, formed in the siding members 40 and the stile members 49. At the top of the channel frame 48 there is disposed a header member 53, as shown in Fig. 7. Where the lower end of the panel engages the foundation 54 the lowermost siding member 40 will rest on top of the foundation 54 with the flange 43 of the lowermost siding member 40 projecting over the upper edge of the foundation 54. The panels 37 are formed as a complete series of siding members 40, thereby forming the non-transparent panel construction. The panel indicated at 48 embodies interposed window frames 55 which are disposed between the side stile members 49. These window frame members may be of the pivoted type which may pivot horizontally or if desired, the windows may be of the vertically sliding type. The transverse panel assembly 38 may also include, as shown in Fig. 8, an inner glass panel 56. The panels 37 and 38 are secured relatively to the foundation 54 after the manner shown in Fig. 32. An anchor bolt 57 is secured in the foundation 54 and projects upwardly therefrom. A pair of angle members 58 and 59 are secured to the adjacent stiles of panels 37 and 38 with angle member or bracket 59 having a horizontal side engaging beneath the horizontal side of angle member or bracket 58. Anchor bolt 57 extends through the overlapping horizontal sides 60 and 61 of brackets 58 and 59, respectively, and a nut 62 threaded on bolt 57 secures the brackets 58 and 59 relative to the anchor bolt 57 and tightly secures the panels 37 and 38 on top of the foundation 54. At each corner of the building there is secured an anchor bolt 63 which extends through an angle shaped corner member 64 having a base plate 65 through which the bolt 63 is adapted to engage. The adjacent right angularly disposed panels are adapted to be bolted to the right angle sides of corner member 64, after the manner shown in Fig. 8. When the corner panel members are secured to the bracket 64 right angularly related trim boards 66 and 67 are secured to the adjacent stiles 49 of the panels and enclose the bracket 64. These trim members 66 and 67 form a hollow space 68 through which service conduits or the like may be extended. Adjacent panels such as panels 37 and 38, as shown in Fig. 8, are secured together with their adjacent stiles spaced apart and outer and inner trim members 69 and 70 respectively, are secured to the adjacent stiles 49 and form therewith a vertical space 71 within which service elements may be placed.

In Fig. 20 there is disclosed a modified form of panel assembly generally indicated at 72. The panel 72 is formed of horizontal siding members 40 with vertical stiles 49 secured to the ends of the siding members 40, and a window or non-transparent panel structure 23 is provided between the upper and lower ends of the stiles 49. In other words, the opening 73 may be of the type known as a picture window opening or if desired, may be closed by means of a non-transparent plywood panel. The panel 72 also includes lower siding members 40 extending below the lower edge of the opening 73.

Referring now to Fig. 21, there is disclosed another modified form of panel assembly generally indicated at 74. The panel 74 includes upper and lower series of siding members 49 and the panel 74 also includes upper and lower openings 75 and 76 in which either transparent or non-transparent panels may be fixedly secured. A window frame structure 77 is disposed between adjacent edges of the panel members 75 and 76.

Referring now to Fig. 22, there is disclosed a further form of panel assembly generally indicated at 78. This panel assembly 78 includes upper and lower series of siding members 40 secured between the vertical stile members 49 and a window frame structure 79 is secured in the panel structure 78 and extends from one of the stile members 49 to a point spaced from the other stile member 49. The series of short siding members 40ᵃ are secured between the inner stile 80 of the frame 79 and the adjacent stile 49.

Referring now to Fig. 23, there is disclosed another panel assembly, generally indicated at 81. This panel assembly 81 is formed of opposite vertical stile members 49 with an upper fixed frame structure 82 and a door frame structure 83 secured to and projecting inwardly from one of the stile members 49. A series of short siding members 40ᵃ are secured between the inner edges of the frames 82 and 83 and the other one of the stile members 49.

Referring now to Fig. 24 there is disclosed a panel 37 formed of a continuous series of secured-together siding members 40 which are also secured between vertical stile members 49.

In Fig. 25 there is disclosed a further panel assembly generally indicated at 84 which is formed of relatively long siding members 40 secured between vertical stiles 49. In the present instance the number of siding members 40 used with panel 84 is greater than the number used in Fig. 24.

Referring now to Fig. 26, there is disclosed another panel assembly indicated generally at 84ᵃ, which is similar to panel 84, with the exception that the trim boards 69 are secured to the outer sides of the vertical stiles 49.

Referring now to Figs. 10, 11, 12 and 13, there is disclosed a roof construction, as shown in top plan in Fig. 6. This roof construction is formed of a plurality of edge abutting boards 85 which have complementary pairs of tongues and grooves 86 and 87, respectively, on the opposite edges thereof. The boards 85 shown in detail in Fig. 31 are mounted on horizontal beams 88 which extend as shown in Figs. 11 and 12 between adjacent panels 37 or 38, or the panels shown in Figs. 20 to 23. The beams 88 extend beyond the outer sides of the siding panels, as shown in Fig. 10, so as to thereby provide an overhang for the roof. It will be understood that suitable roofing material will be disposed on top of the tongue and groove members 85.

Referring now to Fig. 19, there is disclosed the fastening means for securing corner or right-angular panels together. The lower ends of the adjacent panels are secured to the right angle bracket 64 and at points above the lower ends of the panels they are secured together by right angle brackets 89.

In the assembly of the building the selected siding panels are assembled and disposed in vertical position on the foundation 54. These panels have brackets 58 and 59 secured to the lower portions thereof and the brackets 58 and 59 are engaged with the anchor bolts 57 and secured by means of the nuts 62. When the side wall panels are raised and the corner panels secured to the lower corner brackets 64 and secured by the angle brackets 89, the roof construction may be assembled with the beams 88 mounted between selected vertical panels, whereupon the roof boards 85 are secured to the beams 88. The desired roofing material may then be placed on top of the boards 85.

With a construction of this kind any predetermined panel arrangement may be used in the assembly of the building which may be a school, dwelling or other building. The building formulated from the panel construction hereinbefore described is preferably a one-floor type.

What is claimed is:

A prefabricated building comprised of a plurality of prefabricated building units secured in edge to edge relation, each unit comprising a pair of spaced stiles having confronting grooves therein and a plurality of siding members in superposed relation extending between said stiles, each siding member having a key at each end engaging a groove and being adhesively secured therein, each siding member including a substantially straight rear edge and a downwardly and outwardly inclined front edge terminating in an inclined flange depending from said front edge said inclined flange being disposed a substantial distance below the rear edge adapted to overlie the top portion of the front edge of an adjacent lower siding member, a top edge having a pair of longitudinally extending parallel tongues therein, a bottom edge having a pair of longitudinally extending grooves adapted to receive the tongues of the next adjacent lower siding member, and a plane rear edge perpendicular to said top and bottom edges, the rear edges of successive siding members being adapted for vertical alignment with said stiles and with each other, adhesive means securing said siding members together and nails extending from the top of each siding member through the bottom thereof and into the top of the next lower siding member for further securing said siding members and setting said adhesive and a header unit secured across the topmost siding member, certain of said units having window and door openings therein, means securing confronting stiles of adjacent units in spaced apart related assembly, the space between said stiles being adapted for the reception of service fixtures, inner and outer trim strips closing the spaces between said units, and means securing each unit to a foundation, said last mentioned means comprising a pair of overlapping angle brackets secured to adjacent stiles at their lower end and an anchor bolt engaging said brackets and the foundation, said trim strips covering said angle brackets.

References Cited in the file of this patent
UNITED STATES PATENTS

| | | |
|---|---|---|
| 758,645 | Hanson | May 3, 1904 |
| 794,595 | Ducker | July 11, 1905 |
| 2,226,332 | Bacci | Dec. 24, 1940 |
| 2,387,659 | Hafsos | Oct. 23, 1945 |
| 2,401,589 | Smith | June 4, 1946 |
| 2,624,920 | Anderson | Jan. 13, 1953 |
| 2,832,101 | Stark | Apr. 29, 1958 |